J. SAHULKA.
ELECTROMOTOR CONTROLLING AND OPERATING SYSTEM FOR ELECTRIC RAILWAYS AND POWER PLANTS.
APPLICATION FILED JUNE 1, 1907.
899,189.
Patented Sept. 22, 1908.
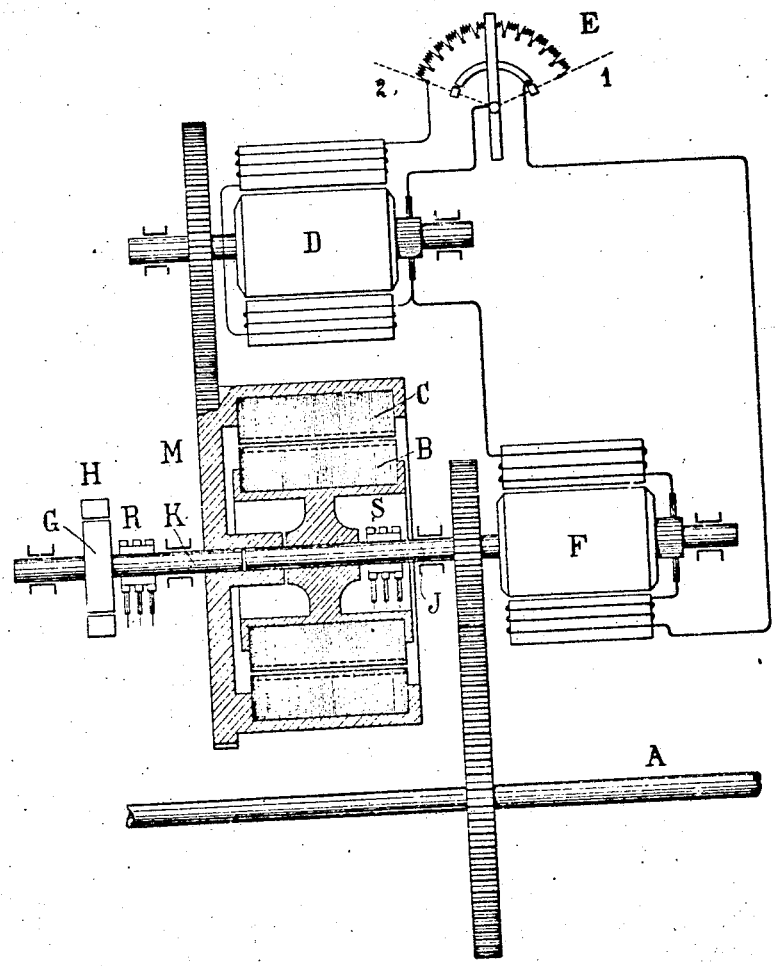

UNITED STATES PATENT OFFICE.

JOHANN SAHULKA, OF VIENNA, AUSTRIA-HUNGARY.

ELECTROMOTOR CONTROLLING AND OPERATING SYSTEM FOR ELECTRIC RAILWAYS AND POWER PLANTS.

No. 899,189.　　　　Specification of Letters Patent.　　Patented Sept. 22, 1908.

Application filed June 1, 1907. Serial No. 376,859.

*To all whom it may concern:*

Be it known that I, JOHANN SAHULKA, doctor of philosophy and professor, a subject of the Austro-Hungarian Monarchy, residing at Vienna, Austria-Hungary, XII, Zenogasse No. 17, have invented new and useful Improvements in Electromotor Controlling and Operating Systems for Electric Railways and Power Plants, of which the following is a specification.

The present invention relates to an improved system of controlling and operating motors and shafts for electric railways and power plants, in which the motor supplied by the working current—and hereinafter referred to as the principal motor—actuates on the one hand the driven shaft and on the other a dynamo which supplies current to a second motor also actuating the driven shaft. The principal motor is formed in two parts both of which are movable, and the motor may be of any convenient continuous or alternating current type.

The present system is advantageous in that no principal current resistances are needed to regulate the number of revolutions of the driven shaft, and that a high degree of efficiency is maintained at all speeds of the driven shaft, since the principal motor always runs at a high speed. Where the system is applied to the working of an electric railway, it is also possible to obtain a recovery of energy on down grades.

The drawing illustrates a convenient arrangement of motors and shafts by way of example in which the principal motor M is a polyphase motor, adapted to be operated direct by means of high-tension current.

The inner part B of the motor is fastened on the shaft J, the outer part C on the concentric shaft K. The working current is supplied to the part C by means of the slip rings R. Other slip rings S may be mounted on the shaft J in order to enable starting resistances to be used in the well known manner during the starting of the motor M. These resistances however need only be of moderate dimensions, because the motor M is started free from load. The device for this purpose is of known construction and is therefore not shown in the drawing. The part B of the motor actuates the driven shaft A either directly or as shown by means of pinion gearing. The part C, actuates direct or through pinions as shown a dynamo D shown in this example as a continuous current, shunt-wound dynamo. The dynamo D is adapted to supply current to a motor F which actuates the shaft A either direct or through pinions as shown in the same manner as the part B of the motor M. In the drawing the rotor B and the motor F are mounted on a common shaft, but it is to be understood that B and F may also if desired be mounted on different shafts. Where the system is applied to the working of an electric railway, the rotor B and the motor F could drive different axle shafts of the motor truck for instance.

The motor F is represented in the drawing as a series motor, but a motor having its field magnet excited independently of the main current could be employed. No principal current resistances are provided in the circuit between the motors D and F; but the electromotive force of the dynamo D is capable of being regulated between wide limits by means of a shunt rheostat E. In the arrangement shown in the drawing the circuit between the motors D and F can be closed by means of the switch lever of the rheostat E. When the switch is in the end position 1 the whole of the resistance is in circuit, but the circuit between the machines D and F is not completed.

In operating the system the motor M is first started free from load. At this stage the circuit between the motors D and F must be interrupted, and therefore the lever of the resistance E is put over to the position 1, while the motor M is being started. As the starting of the driven shaft A requires a high moment of rotation, and the dynamo D can be turned with ease when not supplying a current, the outer part C only of the motor revolves at the starting stage until a certain maximum velocity is attained. When it is desired to start the shaft A the circuit is completed between the motors D and F, and the excitation of the dynamo D is gradually intensified. To effect this purpose the lever of the rheostat E is gradually turned from the end position 1 toward the position 2, whereby the motor F is supplied with current of gradually increasing strength, and actuates the shaft A. At the same time this shaft A is also actuated by the principal motor M since the dynamo D in supplying current, retards the motion of C and consequently the rotor B also exerts a moment f rotation on the shaft K and thence on the shaft A. The more the excitation of the dynamo D, is intensified, the more will the motors M and F actuate the shaft A. Moreover, during the starting of the shaft A a large part of the energy of motion which is stored up in the dynamo D and in the part C of the motor, is transformed into electrical energy and is utilized for actuating the shaft A through the motor F thus increasing the initial moment of rotation.

The regulation of the velocity of the shaft A is effected by altering the resistance E. The more this is reduced, the higher the speed of the shaft A. Since the resistance E is traversed by the excitation current of the dynamo D it can be divided into a large number of stages and therefore the starting and speed regulation of the shaft A can be effected in a very gentle manner. So long as the shaft A is actuated in the described manner, the motor M exerts one half the power directly on the shaft A, the other half of the power being transmitted to the dynamo D furnishing current for the motor F. It will be evident therefore that the motor M must be of sufficient size to develop the whole power required for driving the shaft A whereas each of the motors D and F needs only to develop half as much power. This system of operating is favorable whatever may be the velocity of shaft A since the principal motor M always runs at high speed, and there is no loss occasioned by the presence of main-current resistances. When, as indicated in the drawing the motor M is an induction motor, it works with a small slip whatever the speed of the shaft A.

If it be desired to increase the velocity of the shaft A to a greater extent than is possible by merely reducing the resistance E, this can be effected by a braking device which is also shown in the drawing at G H though the system can be used even without the brake. When the shaft A has attained a certain speed by the gradual reduction of the resistance E, the circuit between the motors D and F can be broken, and the part C of the motor can be gradually braked by means of the brake G H, the speed of the part B and the shaft A being thereby raised to a maximum. The transmission of motion to the shaft A is then effected through the principal motor M alone. The dynamo D ceases to run, and the motor F runs with the motor M no current being supplied. As shown in the drawing the regulating resistance E is so arranged that by turning the switch lever into the end position 2, the circuit of the dynamo D is broken, the lever should therefore be turned into the end position 2 and the brake applied simultaneously. Where an air brake is employed, the turning of the switch lever may be utilized in any known manner to operate the valves for putting on the brake.

By its application to electric railways, the present invention enables recovery of energy to be effected on down grades. In this event, the principal motor M must be either an induction motor or a continuous-current shunt motor. As soon as the part C of the motor is stopped by the brake, and the speed of the shaft A has exceeded a certain limit, the motor M returns energy to the source of current supply. In order to attain that the motor shall return energy to the main circuit when the shaft A is running at a lower speed and before the part C has been stopped by the brake, all that is necessary is to provide for separate excitation of the field magnets of the motor F. In such case, at a given velocity of the shaft A, the motor F, acting as a generator, supplies current to the dynamo D, which acting as a motor causes the principal motor M to run in super-synchronous step, whereby energy is returned to the source of current. When the working current is continuous current, all the motors M, D and F must be shunt wound machines, in order to secure a recovery of electrical energy. The single motors M, D and F may also if desired be replaced by groups of similar motors without departing from the main features of the invention.

The described system of operating possesses advantages over known systems, such for instance as the Ward Leonard system, in many respects. The motors D and F need be of only half the power as the principal motor M, instead of the same power; in starting the shaft A a large part of the energy of motion of the motors D and C is utilized in actuating the shaft; direct driving is also possible by means of the principal motor only, without using the transformer plant, thus effecting a considerable saving of energy. Finally, when the system is applied to electric railways, a recovery of energy as has been stated becomes possible on down grades.

What I claim is:—

1. An electro motor controlling and operating system for electric railways and power plants, comprising in combination a two part motor actuated from a main electric current supply source, a driven shaft adapted to be actuated by one part of said motor, a dynamo driven by the other part of said motor, a second motor connected with the driven shaft, and means whereby the current generated by the dynamo is adapted to actuate said motor to actuate the driven shaft independently of the first named motor.

2. An electro motor controlling and operating system for electric railways and power plants comprising in combination a two part principal motor actuated from a main electric current supply source, a driven shaft adapted to be actuated by one part of said motor, a dynamo driven by the other part of said motor, a second motor, connections between the second motor and the dynamo whereby the current generated by the latter can actuate the second motor, and connections between the second motor and the driven shaft whereby the former is adapted to actuate the driven shaft independently of the principal motor.

3. An electro motor controlling and operating system for electric railways and power plants comprising in combination a two part principal motor actuated from a main electric current supply source, a separate shaft for each part of said motor, a main driven shaft adapted to be actuated by one part of said motor, a dynamo driven by the other part of said motor, a second motor connected with the driven shaft, and means whereby the current generated by the dynamo is adapted to actuate said motor to actuate the driven shaft independently of the first named motor.

4. An electro-motor controlling and operating system for electric railways and power plants comprising in combination a two part principal motor actuated from a main electric current supply source, a separate shaft for each part of said motor, a main driven shaft adapted to be actuated by one part of said motor, a dynamo driven by the second part of the principal motor a second motor on the same shaft as that part of the principal motor actuated by the dynamo, and means whereby the current of the dynamo is adapted to actuate the said motor to actuate the driven shaft independently of the first named motor.

5. An electro motor controlling and operating system for electric railways and power plants comprising in combination a two part principal motor actuated from a main electric current supply source, a separate shaft for each part of said motor, a main driven shaft adapted to be actuated by one part of said motor, a dynamo driven by the second part of the principal motor gearing between said dynamo and said second part of the principal motor, a second motor connection between the latter and the dynamo for actuating said second motor, and means whereby the latter is adapted also to actuate the main driven shaft.

6. An electro motor controlling and operating system for electric railways and power plants comprising in combination a two part principal motor actuated from a main electric current supply source, a separate shaft for each part of said motor, a main driven shaft adapted to be actuated by one part of said motor, a dynamo driven by the second part of the principal motor, a second motor, connections between the latter and the dynamo for actuating said second motor and gearing between the second motor and the driven shaft whereby the second motor is adapted also to actuate said driven shaft.

7. An electro motor controlling and operating system for electric railways and power plants comprising in combination a two part motor actuated from a main electric current supply source, a driven shaft adapted to be actuated by one part of said motor a dynamo driven by the other part of said motor, means whereby the current generated by said dynamo is adapted also to actuate said driven shaft independently of the first named part of said motor, and means whereby the dynamo is rendered inoperative after the main driven shaft is started.

8. An electro motor controlling and operating system for electric railways and power plants comprising in combination a two part motor actuated from a main electric current supply source, a driven shaft adapted to be actuated by one part of said motor, a dynamo driven by the other part of said motor, means whereby the current generated by said dynamo is adapted also to actuate said driven shaft independently of the first named part of said motor, and a brake adapted to retard and render inoperative the said dynamo after the main shaft is started.

9. An electro motor controlling and operating system for electric railways and power plants, comprising in combination a two part motor actuated from a main electric current supply source, a driven shaft adapted to be actuated by one part of said motor, a dynamo driven by the other part of said motor, a second motor connected with the driven shaft, and means whereby the current generated by the dynamo is adapted to actuate said motor to actuate the driven shaft independently of the first named motor, and a brake adapted to retard and render inoperative said dynamo after the main shaft is started.

10. An electro motor controlling and operating system for electric railways and power plants, comprising in combination a two part motor actuated from a main electric current supply source, a driven shaft adapted to be actuated by one part of said motor, a dynamo driven by the other part of said motor, a second motor connected with the driven shaft, and means whereby the current generated by the dynamo is adapted to actuate said motor to actuate the driven shaft independently of the first named motor, and means for regulating the power of said dynamo, and means adapted to retard and render inoperative said dynamo and said second motor after the main shaft is started.

In testimony whereof I have signed my name to this specification in the presence of two subscribing witnesses.

JOHANN SAHULKA.

Witnesses:
OTTO ENGLISCH,
ROBT. W. HEINGARTNER.